(12) United States Patent
Sen et al.

(10) Patent No.: US 10,390,383 B2
(45) Date of Patent: Aug. 20, 2019

(54) TIMER-BASED HANDLING OF MULTIPLE CONNECTION REQUESTS

(71) Applicant: Telefonaktiebolaget LM Ericsson (publ), Stockholm (SE)

(72) Inventors: Ayan Sen, Bangalore (IN); Indranil Ghosh, Howrah (IN); Debasish Sarkar, Frisco, TX (US); Shikha Singh, New Delhi (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 17 days.

(21) Appl. No.: 15/830,357

(22) Filed: Dec. 4, 2017

(65) Prior Publication Data

US 2019/0174558 A1    Jun. 6, 2019

(51) Int. Cl.
*H04W 76/10* (2018.01)
*H04W 76/25* (2018.01)

(52) U.S. Cl.
CPC ........... *H04W 76/25* (2018.02); *H04W 76/10* (2018.02)

(58) Field of Classification Search
CPC ..... H04W 76/25; H04W 76/10; H04W 12/06; H04W 12/08; H04W 80/02; H04L 63/0428
See application file for complete search history.

(56) References Cited

U.S. PATENT DOCUMENTS

| | | | |
|---|---|---|---|
| 9,591,481 B1* | 3/2017 | Fisher | .................. H04W 76/10 |
| 2017/0142587 A1* | 5/2017 | Lee | ...................... H04W 76/10 |
| 2017/0325273 A1 | 11/2017 | Chaugule et al. | |
| 2017/0359761 A1 | 12/2017 | Manepalli et al. | |

FOREIGN PATENT DOCUMENTS

| | | | |
|---|---|---|---|
| WO | 2016057095 A1 | 4/2016 | |
| WO | 2017139910 A1 | 8/2017 | |

\* cited by examiner

*Primary Examiner* — Kashif Siddiqui
(74) *Attorney, Agent, or Firm* — Coats & Bennett, PLLC (57) ABSTRACT

A node of a wireless communication network receives a first request for establishment of a connection between a communication device and the wireless communication network. Upon receiving the first request, the node starts a timer and establishes a context for the connection between the communication device and the wireless communication network. Further, the node receives a second request for establishment of a connection between a communication device and the wireless communication network. Depending on a state of the timer when receiving the second request, the node selects between: A) establishing an additional context for the connection between the communication device and the wireless communication network while maintaining the established context, and B) releasing the established context and establishing a new context for the connection between the communication device and the wireless communication network.

24 Claims, 7 Drawing Sheets

FIG. 7

TIMER-BASED HANDLING OF MULTIPLE CONNECTION REQUESTS

TECHNICAL FIELD

The present invention relates to methods for controlling establishment of a connection to a wireless communication system and to corresponding devices and systems.

BACKGROUND

In wireless communication networks, a UE (user equipment) which needs to transmit data typically first needs to setup a connection to the wireless communication network. In the LTE (Long Term Evolution) technology specified by 3GPP ($3^{rd}$ Generation Partnership Project) the connection setup involves performing an RRC connection establishment procedure between the UE and an eNB. The RRC connection establishment procedure is for example described in 3GPP TS 36.331 V14.4.0 (2017 Sep.), section 5.3.3. Further, the connection setup involves that the eNB forwards an Initial UE Message by NAS (Non Access Stratum) transport to an MME (Mobility Management Entity). The Initial UE Message procedure is for example described in 3GPP TS 36.413 V14.4.0 (2017 Sep.), section 8.6.2. Further, the connection setup involves a context setup procedure and a bearer setup procedure between the eNB and the MME. The context setup procedure is for example described in 3GPP TS 36.413 V14.4.0 (2017 Sep.), section 8.3.1, and the bearer setup procedure is for example described in 3GPP TS 36.413 V14.4.0, section 8.2.1. Further, the connection setup involves establishment of a tunnel management session between the MME and an SGW (Serving Gateway), as for example described in 3GPP 29.274 V14.5.0 (2017 Sep.), sections 7.2.1 and 7.2.2.

In the above connection setup, the RRC Connection Request message from the UE to the eNB typically indicates an establishment cause, such as MO (mobile originating) data, MO signalling, MO voice call, MT (mobile terminating) access as well as an UE identity, e.g., in terms of an S-TMSI (SAE Temporary Mobile Station Identifier). The UE identity is used for identification of the UE in the connection setup procedures.

However, in some cases in may occur that the UE sends two RRC Connection Request messages, each indicating a different establishment cause, in quick succession. Specifically, the UE may send a first RRC Connection Request message, resulting in successful RRC connection establishment, and then send a second RRC Connection Request message. This may for example result from different upper layer processes in the UE independently triggering the connection setup. In the above-mentioned connection setup procedures this has the effect that the MME identifies two Initial UE Messages with different establishment causes from the same UE and releases the already established RRC connection and the related context of the UE. This behavior is based on the MME being implemented in such a way that in abnormal conditions a new context for the connection is established at the cost of an already existing one. While this prioritization of the newly established context over the existing one may help to resolve conflicts and ensure consistent behavior, it may also adversely affect operation of the UE, e.g., by causing a delay or dropping of a call being established.

Accordingly, there is a need for techniques which allow for efficiently and reliably controlling connection setup in a wireless communication network.

SUMMARY

According to an embodiment, a method of controlling establishment of a connection between a communication device and a wireless communication network is provided. According to the method, a node of the wireless communication network receives a first request for establishment of a connection between a communication device and the wireless communication network. Upon receiving the first request, the node starts a timer and establishes a context for the connection between the communication device and the wireless communication network. Further, the node receives a second request for establishment of a connection between a communication device and the wireless communication network. Depending on a state of the timer when receiving the second request, the node selects between: A) establishing an additional context for the connection between the communication device and the wireless communication network while maintaining the established context, and B) releasing the established context and establishing a new context for the connection between the communication device and the wireless communication network.

According to a further embodiment, a node for a wireless communication network is provided. The node may be configured to perform the above method. Accordingly, the node may be configured to:

receive a first request for establishment of a connection between a communication device and the wireless communication network;

upon receiving the first request, start a timer and establish a context for the connection between the communication device and the wireless communication network;

receive a second request for establishment of a connection between a communication device and the wireless communication network; and depending on a state of the timer when receiving the second request, select between: A) establishing an additional context for the connection between the communication device and the wireless communication network while maintaining the established context, and B) releasing the established context and establishing a new context for the connection between the communication device and the wireless communication network.

According to an embodiment, the node may comprise at least one processor and a memory containing instructions executable by the at least one processor, whereby the node is operative to:

receive a first request for establishment of a connection between a communication device and the wireless communication network;

upon receiving the first request, start a timer and establish a context for the connection between the communication device and the wireless communication network;

receive a second request for establishment of a connection between a communication device and the wireless communication network; and depending on a state of the timer when receiving the second request, select between: A) establishing an additional context for the connection between the communication device and the wireless communication network while maintaining the established context, and B) releasing the established context and establishing a new context for the connection between the communication device and the wireless communication network.

According to an embodiment, the node may comprise:
a module configured to receive a first request for establishment of a connection between a communication device and the wireless communication network;
a module configured to, upon receiving the first request, start a timer and establish a context for the connection between the communication device and the wireless communication network;
a module configured to receive a second request for establishment of a connection between a communication device and the wireless communication network; and
a module configured to, depending on a state of the timer when receiving the second request, select between: A) establishing an additional context for the connection between the communication device and the wireless communication network while maintaining the established context, and B) releasing the established context and establishing a new context for the connection between the communication device and the wireless communication network.

According to a further embodiment, a system is provided. The system comprises a communication device and a node of the wireless communication network. The communication device is configured to initiate a first request for establishment of a connection between the communication device and the wireless communication network and a second request for establishment of a connection between the communication device and the wireless communication network. The node of the wireless communication network, is configured to receive the first request and, upon receiving the first request, start a timer and establish a context for the connection between the communication device and the wireless communication network. Further, the node is configured to receive a second request for establishment of a connection between a communication device and the wireless communication network and, depending on a state of the timer when receiving the second request, select between: A) establishing an additional context for the connection between the communication device and the wireless communication network while maintaining the established context, and B) releasing the established context and establishing a new context for the connection between the communication device and the wireless communication network.

According to a further embodiment of the invention, a computer program or computer program product is provided, e.g., in the form of a non-transitory storage medium, which comprises program code to be executed by at least one processor of a node of a wireless communication network. Execution of the program code causes the node to:
receive a first request for establishment of a connection between a communication device and the wireless communication network;
upon receiving the first request, start a timer and establish a context for the connection between the communication device and the wireless communication network;
receive a second request for establishment of a connection between a communication device and the wireless communication network; and
depending on a state of the timer when receiving the second request, select between: A) establishing an additional context for the connection between the communication device and the wireless communication network while maintaining the established context, and B) releasing the established context and establishing a new context for the connection between the communication device and the wireless communication network.

Details of such embodiments and further embodiments will be apparent from the following detailed description of embodiments.

DETAILED DESCRIPTION OF EMBODIMENTS

In the following, concepts in accordance with exemplary embodiments of the invention will be explained in more detail and with reference to the accompanying drawings. The illustrated embodiments relate to control of connection establishment in a wireless communication network. In the illustrated examples, it is assumed that the wireless communication network is based on the LTE radio access technology. However, it is noted that the illustrated concepts could also be applied in connection with other radio technologies, such as the 5G ($5^{th}$ Generation) radio technology currently developed by 3GPP.

In the illustrated examples, a timer is used for controlling the handling of two subsequent service requests initiated from the same UE. In the following, this timer will be referred to as "tServiceReq". When a node of the wireless communication network receives the first service request, the node starts the timer "tServiceReq". In response to the first service request, the node also establishes a context for a connection between the UE and the wireless communication network. The context for the connection may be defined as a set of information and/or resources associated with the UE and the connection between the UE and the wireless communication network. The context may include control parameters for establishing or maintaining the connection. Further, the context may also include device and/or network resources reserved for the connection. Depending on the status of the timer "tServiceReq" when the node receives the second service request, the node decides whether to A) maintain the already existing context and establish an additional context for the connection between the UE and the wireless communication network, or to B) release the already existing context and establish a new context for the connection between the UE and the wireless communication network. The node may in particular correspond to an MME. However, it is noted that similar functionalities could also be implemented in other types of nodes, e.g., in an AMF (Access and Mobility Management Function) of a 5G core network, as for example described in 3GPP TS 23.501 V1.5.0 (2017 Nov.).

Figure 1:
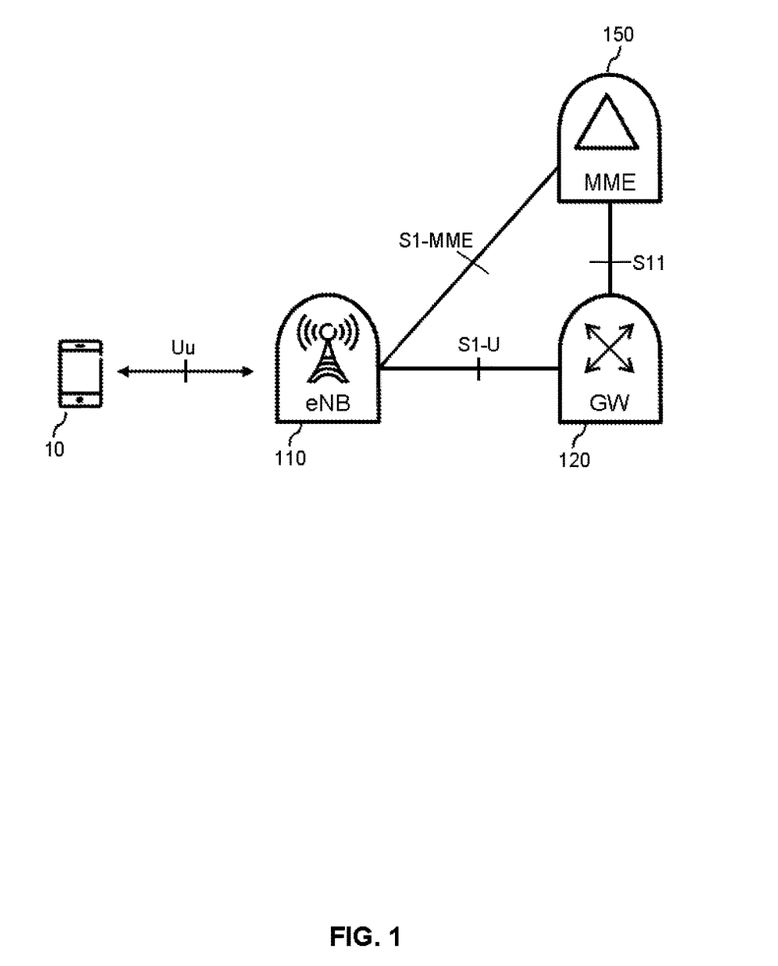
FIG. 1 schematically illustrates elements of a wireless communication system according to an embodiment of the invention.

FIG. 1 schematically illustrates elements of a wireless communication network involved in processes of controlling connection establishment according to the illustrated concepts. Specifically, FIG. 1 illustrates a UE 10 and nodes of the wireless communication network, in particular an eNB 110, an SGW 120, and an MME 150. Here, it is noted that the eNB 110 is typically regarded as being part of a RAN (radio access network) of the wireless communication network, in the case of the LTE radio access technology also referred to as E-UTRAN (Evolved UMTS Radio Access Network). The SGW 120 and the MME 150 are typically regarded as being part of a CN (core network) of the wireless communication network. As illustrated, the UE 10 and the eNB 110 may communicate user plane data and control plane data via a radio interface, in the LTE radio technology referred to as Uu interface. Further, the eNB 110 and the SGW 120 may communicate user plane data related to the UE 10 via an interface referred to as S1-U. One or more bearers for carrying the user plane data, in the LTE technology also referred to as E-RAB (E-UTRAN Radio Access Bearer), may be established over the Uu interface and the S1-U interface between the UE 10 and the SGW 120. In other words, an E-RAB may be regarded as a concatenation of a radio bearer over the Uu interface and an S1 bearer over the S1-U interface. A connection between the UE 10 and the wireless communication network may have a default E-RAB and optionally also one or more additional E-RABs, also referred to as dedicated E-RABs.

Further, the eNB 110 and the MME 150 may communicate control plane data related to the UE 10 via an interface referred to as S1-MME. Further, the MME 150 and the SGW 120 may communicate control plane data related to the UE 10 via an interface referred to as S11. The architecture illustrated in FIG. 1 and the above interfaces are further described in 3GPP TS 23.401 V14.5.0 (2017 Sep.) and 3GPP TS 36.401 V14.0.0 (2017 Mar.). Protocols and procedures used on these interfaces are further described in 3GPP TS 36.331 V14.4.0, 3GPP TS 36.413 V14.4.0, and 3GPP 29.274 V14.5.0.

In a system as illustrated in FIG. 1, the MME 150 may implement the procedure as outlined above to handle multiple service requests initiated by the UE 10 in order to establish a connection to the wireless communication network. Specifically, the MME 150 may apply the timer "tServiceReq" to check whether two subsequent service requests initiated by the UE 10 are received within a time span which is sufficiently short to allow assuming that the two service requests are triggered by different services which substantially simultaneously require establishment of a connection to the wireless communication network. Such time span may be in the range of 400 ms to 800 ms. Accordingly, the timer "tServiceReq" would typically be set to a value in the range of 400 ms to 800 ms. On the other hand, if two subsequent service requests initiated by the UE 10 are received within a longer time span, the MME 150 may assume that the second subsequent service request is due to some abnormal condition, e.g., caused by the UE 10 temporarily being out of radio coverage and sending a new service request to re-establish its connection to the wireless communication network.

An example of a scenario where the MME 150 uses the timer "tServiceReq" for handling two subsequent service requests from the UE 10 may be as follows:

1. While being in RRC idle state, the UE 10 initiates an RRC connection establishment procedure with the eNB 110, as for example described in 3GPP TS 36.331 V14.4.0, section 5.3.3. This involves that the UE 10 sends a first RRC Connection Request via the Uu interface to the eNB 110. The first RRC Connection Request indicates a UE identity, e.g., in terms of an S-TMSI. The first RRC Connection Request may for example indicate "MO Data" as establishment cause. The first RRC Connection Request initiates establishment of an RRC connection between the UE 10 and the eNB 110. The RRC connection procedure may be triggered by a higher layer application which needs to transmit data to the wireless communication network or receive data from the wireless communication network. Substantially at the same time, i.e., while the RRC connection procedure is not yet completed, the eNB 110 initiates a paging procedure towards the UE 10, as for example described in 3GPP TS 36.331 V14.4.0, section 5.3.2. This involves that the eNB 110 sends a Paging message via the Uu interface to the UE 10.

2. Once the RRC connection has been successfully established, i.e., the UE 10 is in RRC connected state, the eNB 110 sends a first Initial UE Message via the S1-MME interface to the MME 150, as for example described in 3GPP TS 36.413 V14.4.0, section 8.6.2.1. In response to receiving the first Initial UE Message, the MME 150 establishes a context for a UE identity indicated in the Initial UE Message, e.g., in terms of an S-TMSI. Upon receiving the Initial UE Message, the MME 150 also starts the timer "tServiceReq". The timer "tServiceReq" is specific for the indicated UE identity. The context may be associated with a combination of MCC (Mobile Country Code), MNC (Mobile Network Code), MMEGI (MME Group Identifier), MMEC (MME Code) and M-TMSI (MME Temporary Mobile Station Identifier). Here, it is noted that the S-TMSI may be regarded as a combination of MMEC and M-TMSI and is part of a GUTI (Globally Unique Temporary UE Identity) of the UE 10.

3. The MME 150 sends a Create Session Request via the S11 interface to the SGW 120, and then receives a Create Session Response via the S11 interface from the SGW 120. The Create Session Response may indicate attributes of a default E-RAB to be established between the UE 10 and the SGW 120. The Create Session Request and Create Session Response are for example described in 3GPP TS 29.274 V14.5.0, sections 7.2.1 and 7.2.2. For initiating establishment of the default E-RAB, the MME 150 then initiates an Initial Context Setup procedure with the eNB 110, as for example described in 3GPP TS 36.413 V14.4.0, section 8.3.1. This involves that the MME 150 sends an Initial Context Setup Request via the S1-MME interface to the eNB 110. The Initial Context Setup Request may also indicate a UE capability of the UE 10.

4. The eNB 110 initiates an initial security activation procedure with the UE 10, as for example described in 3GPP TS 36.331 V14.4.0, section 5.3.4. If the UE capability is not indicated in the Initial Context Setup Request sent by the MME 150, the eNB 110 may also initiate a UE capability transfer procedure with the UE 10, as for example described in 3GPP TS 36.331 V14.4.0, section 5.6.3. Upon successful completion of the procedure(s), the eNB 110 initiates an RRC connection reconfiguration procedure with the UE 10 in order to setup the default E-RAB on the Uu interface. The RRC connection reconfiguration procedure is for example described in 3GPP TS 36.331, section 5.3.5.

5. Upon successful completion of the RRC connection reconfiguration procedure, the eNB 110 sends an Initial Context Setup Response via the S1-MME interface to the MME 150. The Initial Context Setup Response indicates successful establishment of the default E-RAB on the Uu interface.

6. In response to receiving the above-mentioned Paging message, the UE 10 now sends a second RRC Connection Request via the Uu interface to the eNB 110, as for example described in 3GPP TS 36.331 V14.4.0, section 5.3.3. The second RRC Connection Request indicates the same UE identity as the above-mentioned first RRC Connection Request. The second RRC Connection Request in this case indicates "MT Access" as establishment cause, i.e., a different establishment cause than the first RRC Connection Request. The second RRC Connection Request is sent in spite of the UE 10 already being in RRC connected state.

7. When receiving the second RRC Connection Request from the UE 10, the eNB 110 does not perform any check regarding the current RRC state of the UE 10, i.e., a check whether the UE 10 is in RRC idle state or RRC connected state. Accordingly, the second RRC Connection Request from the UE 10 is admitted, resulting in successful establishment of a second RRC Connection for the UE 10.

8. After successful establishment of the second RRC connection, the eNB 110 sends a second Initial UE Message via the S1-MME interface to the MME 150, as for example described in 3GPP TS 36.413 V14.4.0, section 8.6.2.1. The second Initial UE Message indicates the same UE identity as the above-mentioned first Initial UE Message.

9. Upon receiving the second Initial UE Message, the MME 150 checks whether it has already established a context for the UE identity indicated in the second Initial UE Message. If this is the case, the MME 150 further checks the state of the timer "tServiceReq" for the UE identity indicated in the second Initial UE Message. Specifically, the MME 150 checks whether the timer "tServiceReq" has expired or not.

10. If the timer "tServiceReq" has expired, the MME 150 assumes that the second Initial UE Message from the same UE 10 is due to an abnormal condition, e.g., due to the UE 10 losing coverage and attempting to establish a new connection to the wireless communication network after having transitioned to RRC idle because re-establishment of the old connection was not possible. Accordingly, the MME 150 initiates a UE Context Release procedure with the eNB 110, as for example described in 3GPP TS 36.413 V14.4.0, section 8.3.3, thereby initiating a release of the context of the UE 10 as maintained by the eNB 110. This involves that the MME 150 sends a UE Context Release Command via the S1-MME interface to the eNB 110, and receives a UE Context Release Complete message via the S1-MME interface from the eNB 110, indicating that releasing of the context of the UE 10 by the eNB 110 is complete. Further, the MME 150 may send a Modify Bearer Request via the S11 interface to the SGW 120, in order to release resources maintained by the SGW 120 for the already established default E-RAB of the UE 10. The Modify Bearer Request and Modify Bearer Response are for example described in 3GPP TS 29.274 V14.5.0, sections 7.2.7 and 7.2.8.

After receiving the UE Context Release Complete message via the S1-MME interface from the eNB 110, indicating that releasing of the context of the UE 10 by the eNB 110 is complete, the MME 150 deletes the old context previously established by the MME 150 for the old connection of the UE 10 to the wireless communication network.

11. After deleting the old context, the MME 150 initiates establishment of a context for the new connection of the UE 10 to the wireless communication network, corresponding to the second RRC Connection Request. For initiating establishment of the default E-RAB for the new connection, the MME 150 then initiates a further Initial Context Setup procedure with the eNB 110, as for example described in 3GPP TS 36.413 V14.4.0, section 8.3.1.

12. If the MME 150 detects that the timer "tServiceReq" has not yet expired, the MME 150 identifies the first Initial UE Message and the second Initial UE Message as constituting a dual service request, triggered by different services requiring transmission of data between the UE 10 and the mobile communication network. In this case, the MME 150 resets the timer "tServiceReq" for the UE 10 and proceeds to establish a context for the second Initial UE Message without deleting the existing context previously established by the MME 150 for the connection of the UE 10 to the wireless communication network.

13. If new PDN (Packet Data Network) connectivity is required for the additional service which triggered the second RRC Connection Request and the second Initial UE Message, the MME 150 sends a further Create Session Request via the S11 interface to the SGW 120. Otherwise, the MME 150 sends a Modify Bearer Request via the S11 interface to the SGW 120, to adapt the bearer configuration of the UE 10 to the requirements of the additional service.

14. Upon receiving the Create Session Response or Modify Bearer Response from the SGW 120, the MME 150 initiates an E-RAB Setup procedure with the eNB 110, as for example described in 3GPP TS 36.413 V14.4.0, section 8.2.1, in order to initiate setup of an additional service for the UE 10. This involves that the MME 150 sends an E-RAB Setup Request via the S1-MME interface to eNB 110. The E-RAB Setup Request indicates a unique E-RAB ID (E-RAB identity) for the additional service. Attributes for setup of the additional E-RAB may be included in the E-RAB Setup Request message.

15. The eNB 110 initiates a further RRC connection reconfiguration procedure with the UE 10. In this course, the eNB 110 may send an RRC Connection Reconfiguration message to the UE 10 which also indicates the attributes of the additional E-RAB.

16. After successful completion of RRC connection reconfiguration procedure, the eNB 110 sends an E-RAB Setup Response message to the MME 150. The E-RAB Setup Response indicates successful establishment of the additional E-RAB.

As explained above, the MME 150 may thus identify dual service requests by using the timer "tServiceReq". In particular, a dual service request may be identified by detecting two subsequent service requests originating from the same UE 10 within the time span defined by the timer "tServiceReq". Upon detecting such dual service request, the MME 150 may proceed to establish an additional bearer for accommodating a service which triggered the second service request, while maintaining a bearer which may already have been established in response to the first service request.

Figure 2:
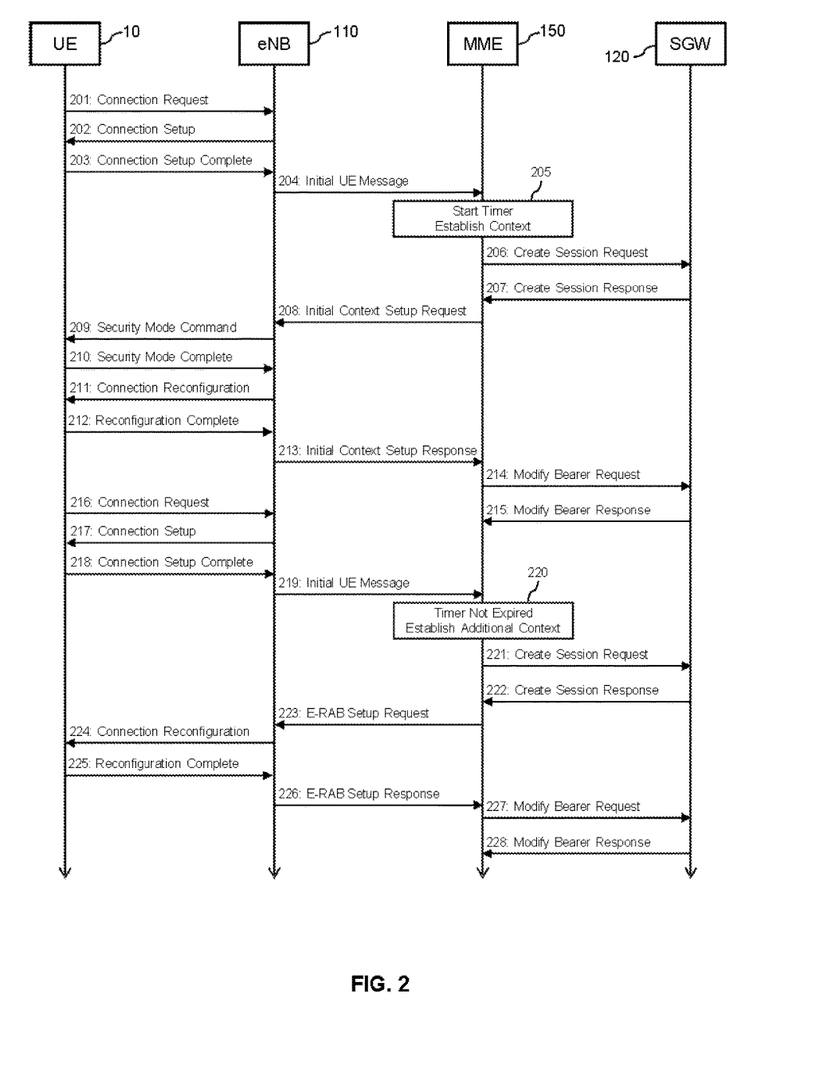
FIG. 2 illustrates an example of processes according to an embodiment of the invention.

FIG. 2 further illustrates an example of processes which are based on the procedures as outlined above. The processes of FIG. 2 involve the UE 10, the eNB 110, the MME 150, and the SGW 120. In the processes of FIG. 2 it is assumed that the UE 10 is initially in RRC idle state, and establishment of a connection to the wireless communication network is then needed because one or more services used on the UE 10 need to transmit data to the wireless communication network or receive data from the wireless communication network. Here, it is noted that the establishment of the connection may be triggered from the UE 10 or from the wireless communication network. As mentioned above, the latter case may for example involve performing a paging procedure with respect to the UE 10.

In the processes of FIG. 2 establishment of the connection is initiated by the UE 10 sending a first RRC Connection Request message 201 to the eNB 110. The first RRC Connection Request message 201 indicates a first establishment cause, e.g., "MO data", "MO voice call", or "MT access". The first RRC Connection Request message 201 also indicates an identity of the UE 10, e.g., in terms of a S-TMSI. The eNB 110 reacts to the first RRC Connection Request message 201 by sending a first RRC Connection Setup message 202 to the UE 10. The UE 10 then sends a first RRC Connection Setup complete message 203 to the eNB 110, thereby confirming successful establishment of an RRC connection between the UE 10 and the eNB 110.

The eNB 110 then proceeds by sending a first Initial UE Message 204 to the MME 150. The first Initial UE Message 204 indicates the same identity of the UE 10 as also indicated by the RRC Connection Request message 201. Here, it is noted that the first Initial UE Message 204 also carries a first UL NAS (Uplink Non Access Stratum) message with a service request from the UE 10 to the MME 150. Accordingly, the first Initial UE Message 204 may also be regarded as a service request from the UE 10 to the MME 150. The first Initial UE Message 204 also indicates the first establishment cause as indicated by the first RRC Connection Request message 201. As illustrated by block 205, upon receiving the first Initial UE Message 204, the MME 150 starts the timer "tServiceReq" and establishes a context for the connection between the UE 10 and the wireless communication network which is currently being established. The context is associated with the identity of the UE 10 and the connection which is being established.

The MME 150 then proceeds by sending a Create Session Request 206 to the SGW 120. The Create Session Request 206 has the purpose of establishing a management session for a PDN connection of the UE 10, which is used for transmission of user plane data between the UE 10 and the wireless communication network. The SGW 120 confirms successful establishment of the management session by sending a Create Session Response 207 to the MME 150. The Create Session Response 207 also indicates attributes of a default E-RAB to be established for the UE 10.

The MME 150 then initiates setup of the default E-RAB on the Uu interface by sending an Initial Context Setup Request 208 to the eNB 110. Having received the Initial Context Setup Request 208, the eNB 110 initiates an initial security activation procedure with the UE 10, which involves that the eNB 110 sends an RRC Security Mode Command message 209 to the UE 10, in response to which the UE 10 sends an RRC Security Mode Complete message 210 to the eNB 110. Further, the eNB 110 performs an RRC connection reconfiguration procedure with the UE 10 in order to setup the default E-RAB on the Uu interface. This involves that the eNB 110 sends an RRC Connection Reconfiguration message 211 to the UE 10, in response to which the UE 10 sends an RRC Reconfiguration Complete message 212 to the eNB 110.

By sending an Initial Context Setup Response 213 to the MME 150, the eNB 110 then confirms that setup of the default E-RAB on the Uu interface is completed. The MME 150 then initiates completion of setup of the default E-RAB on the S1-U interface by sending a Modify Bearer Request 214 to the SGW 120. By sending a Modify Bearer Response to 215 to the MME 150, the SGW 120 confirms that setup of the default E-RAB is also completed on the S1-U interface.

In this situation, the UE 10 sends a second RRC Connection Request message 216 to the eNB 110. The second RRC Connection Request message 216 indicates a second establishment cause, e.g., "MO data", "MO voice call", or "MT access". In the present example, the second establishment cause is assumed to be different from the first establishment cause. For example, the first establishment cause may correspond to "MO data" while the second establishment cause corresponds to "MT Access", or vice versa. The second RRC Connection Request message 216 also indicates the identity of the UE 10. Specifically, the second RRC Connection Request message 216 indicates the same identity of the UE 10 as the first RRC Connection Request message 201, e.g., the same S-TMSI. The eNB 110 reacts to the second RRC Connection Request message 216 by sending a second RRC Connection Setup message 217 to the UE 10. The UE 10 then sends a second RRC Connection Setup complete message 218 to the eNB 110, thereby confirming successful establishment of a further RRC connection between the UE 10 and the eNB 110.

The eNB 110 then proceeds by sending a second Initial UE Message 219 to the MME 150. The second Initial UE Message 219 indicates the same identity of the UE 10 as also indicated by the first Initial UE Message 204. Here, it is noted that the second Initial UE Message 219 also carries a first UL NAS message with a service request from the UE 10 to the MME 150. Accordingly, the second Initial UE Message 219 may also be regarded as a service request from the UE 10 to the MME 150. The second Initial UE Message 219 also indicates the second establishment cause as indicated by the second RRC Connection Request message 216. As illustrated by block 220, upon receiving the second Initial UE Message 219, the MME 150 checks the status of the timer "tServiceReq" and detects that the timer has not yet expired. Accordingly, the MME 150 decides to establish an additional context for the connection between the UE 10 and the wireless communication network. Also the additional context is associated with the identity of the UE 10 and the connection which is being established. At this point, the MME 150 may also reset the timer "tServiceReq", to thereby allow using the timer also when handling a still later Initial UE Message from the UE 10.

In the example of FIG. 2, it is assumed that new PDN connectivity is required for the service which triggered the second RRC Connection Request message 216. The MME 150 therefore proceeds by sending a further Create Session Request 221 to the SGW 120. The further Create Session Request 221 has the purpose of establishing a management session for an additional PDN connection of the UE 10. For example, the already established PDN connection and the additional PDN connection may be associated with different APN (Access Point Names). The SGW 120 confirms successful establishment of the management session by sending a further Create Session Response 222 to the MME 150. The further Create Session Response 222 also indicates attributes of an additional E-RAB to be established for the UE 10. The additional E-RAB has the purpose of carrying user plane data related to the service which triggered the second RRC Connection Request message 216.

The MME 150 then initiates establishment of the additional E-RAB by sending an E-RAB Setup Request 223 to the eNB 110. Having received the E-RAB Setup Request 223, the eNB 110 performs an RRC connection reconfiguration procedure with the UE 10 in order to setup the additional E-RAB on the Uu interface. This involves that the eNB 110 sends an RRC Connection Reconfiguration message 224 to the UE 10, in response to which the UE 10 sends an RRC Reconfiguration Complete message 225 to the eNB 110.

By sending an E-RAB Setup Response 226 to the MME 150, the eNB 110 then confirms that setup of the additional E-RAB on the Uu interface is completed. The MME 150 then initiates completion of setup of the additional E-RAB on the S1-U interface by sending a Modify Bearer Request 227 to the SGW 120. By sending a Modify Bearer Response to 228 to the MME 150, the SGW 120 confirms that setup of the default E-RAB is also completed on the S1-U interface.

As a result, user plane data of both services can be carried without interruption, with user plane data of the service which triggered the first RRC Connection Request message 201 being carried by the default E-RAB and user plane data of the service which triggered the second RRC Connection Request message 216 being carried by the additional E-RAB.

Figure 3:
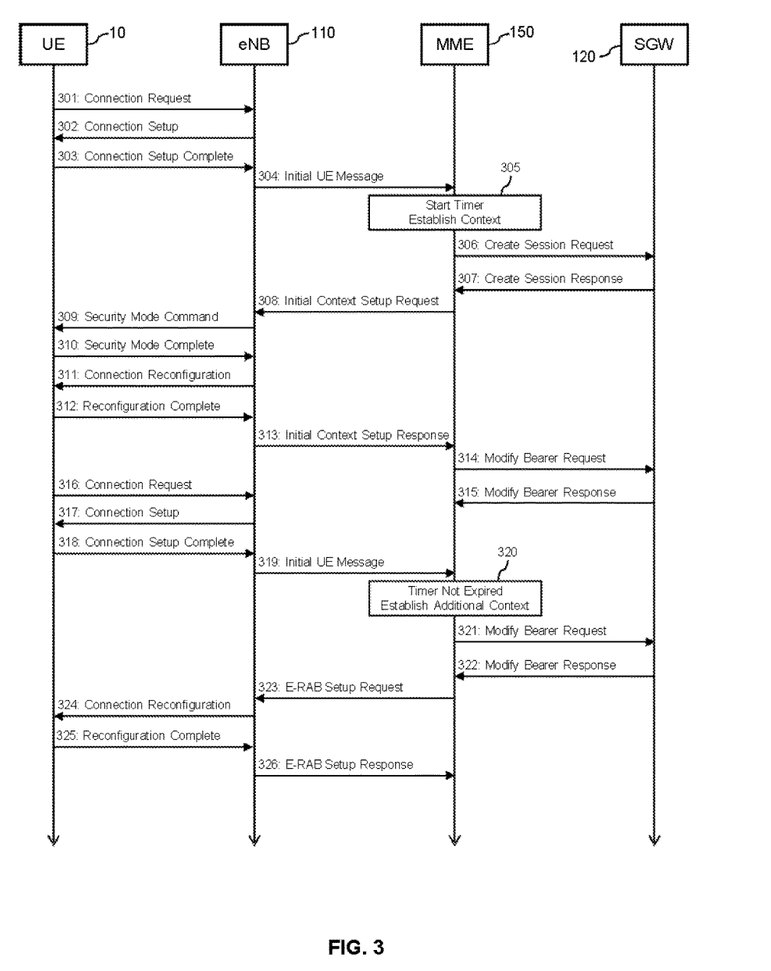
FIG. 3 illustrates a further example of processes according to an embodiment of the invention.

FIG. 3 further illustrates a further example of processes which are based on the procedures as outlined above. The processes of FIG. 3 involve the UE 10, the eNB 110, the MME 150, and the SGW 120. In the processes of FIG. 3 it is assumed that the UE 10 is initially in RRC idle state, and establishment of a connection to the wireless communication network is then needed because one or more services used on the UE 10 need to transmit data to the wireless communication network or receive data from the wireless communication network. Again, it is noted that the establishment of the connection may be triggered from the UE 10 or from the wireless communication network. As mentioned above, the latter case may for example involve performing a paging procedure with respect to the UE 10.

In the processes of FIG. 3 establishment of the connection is initiated by the UE 10 sending a first RRC Connection Request message 301 to the eNB 110. The first RRC Connection Request message 201 indicates a first establishment cause, e.g., "MO data", "MO voice call", or "MT access". The first RRC Connection Request message 301 also indicates an identity of the UE 10, e.g., in terms of a S-TMSI. The eNB 110 reacts to the first RRC Connection Request message 301 by sending a first RRC Connection Setup message 302 to the UE 10. The UE 10 then sends a first RRC Connection Setup complete message 303 to the eNB 110, thereby confirming successful establishment of an RRC connection between the UE 10 and the eNB 110.

The eNB 110 then proceeds by sending a first Initial UE Message 304 to the MME 150. The first Initial UE Message 304 indicates the same identity of the UE 10 as also indicated by the RRC Connection Request message 301. Here, it is noted that the first Initial UE Message 304 also carries a first UL NAS message with a service request from the UE 10 to the MME 150. Accordingly, the first Initial UE Message 304 may also be regarded as a service request from the UE 10 to the MME 150. The first Initial UE Message 304 also indicates the first establishment cause as indicated by the first RRC Connection Request message 301. As illustrated by block 305, upon receiving the first Initial UE Message 304, the MME 150 starts the timer "tServiceReq" and establishes a context for the connection between the UE 10 and the wireless communication network which is currently being established. The context is associated with the identity of the UE 10 and the connection which is being established.

The MME 150 then proceeds by sending a Create Session Request 306 to the SGW 120. The Create Session Request 306 has the purpose of establishing a management session for a PDN connection of the UE 10, which is used for transmission of user plane data between the UE 10 and the wireless communication network. The SGW 120 confirms successful establishment of the management session by sending a Create Session Response 307 to the MME 150. The Create Session Response 307 also indicates attributes of a default E-RAB to be established for the UE 10.

The MME 150 then initiates setup of the default E-RAB on the Uu interface by sending an Initial Context Setup Request 308 to the eNB 110. Having received the Initial Context Setup Request 308, the eNB 110 initiates an initial security activation procedure with the UE 10, which involves that the eNB 110 sends an RRC Security Mode Command message 309 to the UE 10, in response to which the UE 10 sends an RRC Security Mode Complete message 310 to the eNB 110. Further, the eNB 110 performs an RRC connection reconfiguration procedure with the UE 10 in order to setup the default E-RAB on the Uu interface. This involves that the eNB 110 sends an RRC Connection Reconfiguration message 311 to the UE 10, in response to which the UE 10 sends an RRC Reconfiguration Complete message 312 to the eNB 110.

By sending an Initial Context Setup Response 313 to the MME 150, the eNB 110 then confirms that setup of the default E-RAB on the Uu interface is completed. The MME 150 then initiates completion of setup of the default E-RAB on the S1-U interface by sending a Modify Bearer Request 314 to the SGW 120. By sending a Modify Bearer Response to 315 to the MME 150, the SGW 120 confirms that setup of the default E-RAB is also completed on the S1-U interface.

In this situation, the UE 10 sends a second RRC Connection Request message 316 to the eNB 110. The second RRC Connection Request message 316 indicates a second establishment cause, e.g., "MO data", "MO voice call", or "MT access". In the present example, the second establishment cause is assumed to be different from the first establishment cause. For example, the first establishment cause may correspond to "MO data" while the second establishment cause corresponds to "MT Access", or vice versa. The second RRC Connection Request message 316 also indicates the identity of the UE 10. Specifically, the second RRC Connection Request message 316 indicates the same identity of the UE 10 as the first RRC Connection Request message 301, e.g., the same S-TMSI. The eNB 110 reacts to the second RRC Connection Request message 316 by sending a second RRC Connection Setup message 317 to the UE 10. The UE 10 then sends a second RRC Connection Setup complete message 318 to the eNB 110, thereby confirming successful establishment of a further RRC connection between the UE 10 and the eNB 110.

The eNB 110 then proceeds by sending a second Initial UE Message 319 to the MME 150. The second Initial UE Message 319 indicates the same identity of the UE 10 as also indicated by the first Initial UE Message 304. Here, it is noted that the second Initial UE Message 319 also carries a first UL NAS message with a service request from the UE 10 to the MME 150. Accordingly, the second Initial UE Message 319 may also be regarded as a service request from the UE 10 to the MME 150. The second Initial UE Message 319 also indicates the second establishment cause as indicated by the second RRC Connection Request message 316. As illustrated by block 320, upon receiving the second Initial UE Message 319, the MME 150 checks the status of the timer "tServiceReq" and detects that the timer has not yet expired. Accordingly, the MME 150 decides to establish an additional context for the connection between the UE 10 and the wireless communication network. Also the additional context is associated with the identity of the UE 10 and the connection which is being established. At this point, the MME 150 may also reset the timer "tServiceReq", to thereby allow using the timer also when handling a still later Initial UE Message from the UE 10.

In the example of FIG. 3, it is assumed that no new PDN connectivity is required for the service which triggered the second RRC Connection Request message 316. The MME 150 therefore proceeds by sending a Modify Bearer Request 321 to the SGW 120. The Modify Bearer Request 321 has the purpose of establishing an additional E-RAB for the UE 10, to be used for carrying user plane data related to the service which triggered the second RRC Connection Request message 316. By sending a Modify Bearer Response to 322 to the MME 150, the SGW 120 confirms that setup of the additional E-RAB is completed on the S1-U interface.

The MME 150 then initiates setup of the additional E-RAB on the Uu interface by sending an E-RAB Setup Request 323 to the eNB 110. Having received the E-RAB Setup Request 323, the eNB 110 performs an RRC connection reconfiguration procedure with the UE 10 in order to setup the additional E-RAB on the Uu interface. This involves that the eNB 110 sends an RRC Connection Reconfiguration message 324 to the UE 10, in response to which the UE 10 sends an RRC Reconfiguration Complete message 325 to the eNB 110.

By sending an E-RAB Setup Response 326 to the MME 150, the eNB 110 then confirms that setup of the additional E-RAB is completed also on the Uu interface. Accordingly, also in the processes of FIG. 3, user plane data of both services can be carried without interruption, with user plane data of the service which triggered the first RRC Connection Request message 301 being carried by the default E-RAB and user plane date of the service which triggered the second RRC Connection Request message 316 being carried by the additional E-RAB. As compared to the example of FIG. 2, no additional PDN connectivity is required for the additional service, and establishment of an additional management session for an additional PDN connection is not required.

Figure 4:
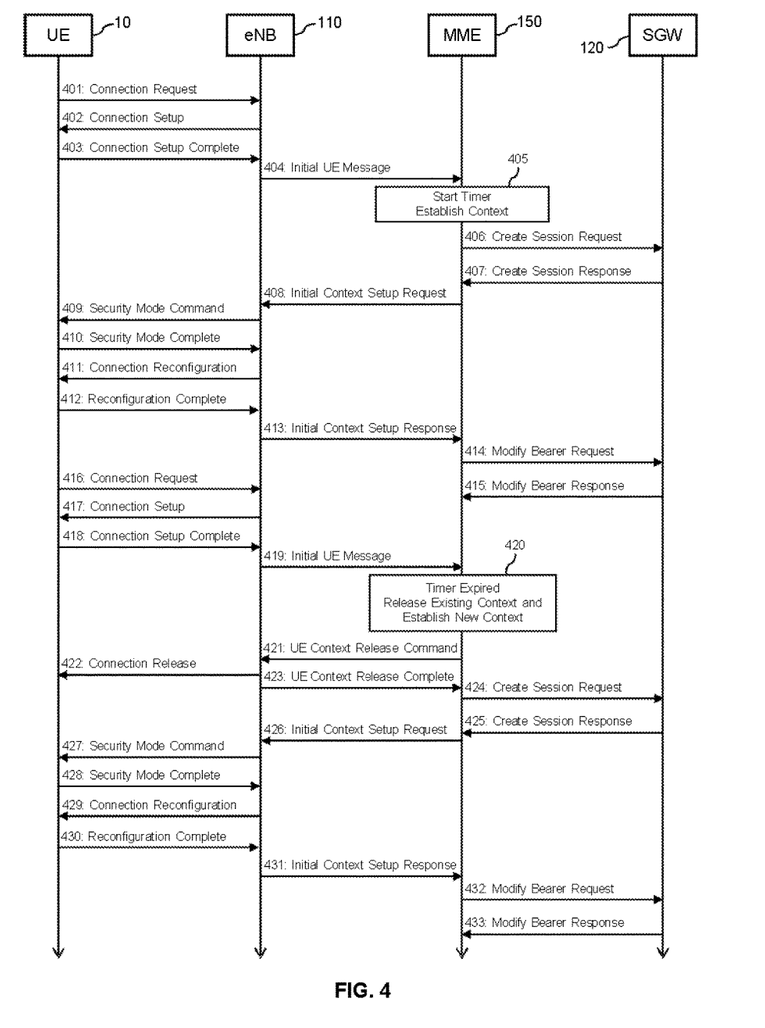
FIG. 4 illustrates a further example of processes according to an embodiment of the invention.

FIG. 4 further illustrates a further example of processes which are based on the procedures as outlined above. The processes of FIG. 4 involve the UE 10, the eNB 110, the MME 150, and the SGW 120. In the processes of FIG. 4 it is assumed that the UE 10 is initially in RRC idle state, and establishment of a connection to the wireless communication network is then needed because one or more services used on the UE 10 need to transmit data to the wireless communication network or receive data from the wireless communication network. Again, it is noted that the establishment of the connection may be triggered from the UE 10 or from the wireless communication network. As mentioned above, the latter case may for example involve performing a paging procedure with respect to the UE 10.

In the processes of FIG. 4 establishment of the connection is initiated by the UE 10 sending a first RRC Connection Request message 401 to the eNB 110. The first RRC Connection Request message 401 indicates a first establishment cause, e.g., "MO data", "MO voice call", or "MT access". The first RRC Connection Request message 401 also indicates an identity of the UE 10, e.g., in terms of a S-TMSI. The eNB 110 reacts to the first RRC Connection Request message 401 by sending a first RRC Connection Setup message 402 to the UE 10. The UE 10 then sends a first RRC Connection Setup complete message 403 to the eNB 110, thereby confirming successful establishment of an RRC connection between the UE 10 and the eNB 110.

The eNB 110 then proceeds by sending a first Initial UE Message 404 to the MME 150. The first Initial UE Message 404 indicates the same identity of the UE 10 as also indicated by the RRC Connection Request message 401. Here, it is noted that the first Initial UE Message 404 also carries a first UL NAS message with a service request from the UE 10 to the MME 150. Accordingly, the first Initial UE Message 404 may also be regarded as a service request from the UE 10 to the MME 150. The first Initial UE Message 404 also indicates the first establishment cause as indicated by the second RRC Connection Request message 416. As illustrated by block 405, upon receiving the first Initial UE Message 404, the MME 150 starts the timer "tServiceReq" and establishes a context for the connection between the UE 10 and the wireless communication network which is currently being established. The context is associated with the identity of the UE 10 and the connection which is being established.

The MME 150 then proceeds by sending a Create Session Request 406 to the SGW 120. The Create Session Request 406 has the purpose of establishing a management session for a PDN connection of the UE 10, which is used for transmission of user plane data between the UE 10 and the wireless communication network. The SGW 120 confirms successful establishment of the management session by sending a Create Session Response 407 to the MME 150. The Create Session Response 407 also indicates attributes of a default E-RAB to be established for the UE 10.

The MME 150 then initiates setup of the default E-RAB on the Uu interface by sending an Initial Context Setup Request 408 to the eNB 110. Having received the Initial Context Setup Request 408, the eNB 110 initiates an initial security activation procedure with the UE 10, which involves that the eNB 110 sends an RRC Security Mode Command message 409 to the UE 10, in response to which the UE 10 sends an RRC Security Mode Complete message 410 to the eNB 110. Further, the eNB 110 performs an RRC connection reconfiguration procedure with the UE 10 in order to setup the default E-RAB on the Uu interface. This involves that the eNB 110 sends an RRC Connection Reconfiguration message 411 to the UE 10, in response to which the UE 10 sends an RRC Reconfiguration Complete message 412 to the eNB 110.

By sending an Initial Context Setup Response 413 to the MME 150, the eNB 110 then confirms that setup of the default E-RAB on the Uu interface is completed. The MME 150 then initiates completion of setup of the default E-RAB on the S1-U interface by sending a Modify Bearer Request 414 to the SGW 120. By sending a Modify Bearer Response to 415 to the MME 150, the SGW 120 confirms that setup of the default E-RAB is also completed on the S1-U interface.

In this situation, the UE 10 sends a second RRC Connection Request message 416 to the eNB 110. The second RRC Connection Request message 416 indicates a second establishment cause, e.g., "MO data", "MO voice call", or "MT access". In the present example, the second establishment cause is assumed to be the same as the first establishment cause. Specifically, the second RRC Connection Request message 416 may be triggered by the UE 10 losing radio coverage, returning to RRC idle state, and attempting to establish a new connection for the same service which also triggered the first RRC Connection Request message 401. However, it is noted that also in this scenario the first establishment cause and the second establishment cause could be different, e.g., if the first RRC Connection Request message 401 was triggered from the wireless communication network by paging and the second RRC Connection Request message 416 is triggered at the UE 10, by the attempt to establish a new connection after losing radio coverage.

The second RRC Connection Request message 416 also indicates the identity of the UE 10. Specifically, the second RRC Connection Request message 416 indicates the same identity of the UE 10 as the first RRC Connection Request message 401, e.g., the same S-TMSI. The eNB 110 reacts to the second RRC Connection Request message 416 by sending a second RRC Connection Setup message 417 to the UE 10. The UE 10 then sends a second RRC Connection Setup complete message 418 to the eNB 110, thereby confirming successful establishment of a further RRC connection between the UE 10 and the eNB 110.

The eNB 110 then proceeds by sending a second Initial UE Message 419 to the MME 150. The second Initial UE Message 419 indicates the same identity of the UE 10 as also indicated by the first Initial UE Message 404. Here, it is noted that the second Initial UE Message 419 also carries a first UL NAS message with a service request from the UE 10 to the MME 150. Accordingly, the second Initial UE Message 419 may also be regarded as a service request from the UE 10 to the MME 150. The second Initial UE Message 419 also indicates the second establishment cause as indicated by the second RRC Connection Request message 416. As illustrated by block 420, upon receiving the second Initial UE Message 419, the MME 150 checks the status of the timer "tServiceReq" and detects that the timer has expired. Accordingly, the MME 150 decides to release the already existing context and establish a new context for the connection between the UE 10 and the wireless communication network. The new context is associated with the identity of the UE 10 and the new connection which is being established for the UE 10. At this point, the MME 150 may also restart the timer "tServiceReq", to thereby allow using the timer also when handling a still later Initial UE Message from the UE 10.

For releasing the existing context, the MME 150 sends a UE Context Release Command 421 to the eNB 110. In response to receiving the UE Context Release Command 421 sends an RRC Connection Release message 422 to the UE 10. The eNB 110 then confirms releasing of the UE context for the first RRC connection by sending a UE Context Release Complete message 423 to the MME 150. The MME 150 then locally deletes the existing context. At this point, the previously established default bearer is released.

The MME 150 then initiates establishment of the new context. For this purpose, the MME 150 sends a further Create Session Request 424 to the SGW 120. The further Create Session Request 424 has the purpose of establishing a new management session for a new PDN connection of the UE 10. The SGW 120 confirms successful establishment of the management session by sending a further Create Session Response 425 to the MME 150. The further Create Session Response 425 also indicates attributes of a new default E-RAB to be established for the UE 10. The new default E-RAB has the purpose of carrying user plane data related to the service which triggered the second RRC Connection Request message 416.

The MME 150 then initiates establishment of the new default E-RAB by sending an Initial Context Setup Request 426 to the eNB 110. Having received the Initial Context Setup Request 426, the eNB 110 initiates an initial security activation procedure with the UE 10, which involves that the eNB 110 sends an RRC Security Mode Command message 427 to the UE 10, in response to which the UE 10 sends an RRC Security Mode Complete message 428 to the eNB 110. Further, the eNB 110 performs an RRC connection reconfiguration procedure with the UE 10 in order to establish the new default E-RAB on the Uu interface. This involves that the eNB 110 sends an RRC Connection Reconfiguration message 429 to the UE 10, in response to which the UE 10 sends an RRC Reconfiguration Complete message 430 to the eNB 110.

By sending an Initial Context Setup Response 431 to the MME 150, the eNB 110 then confirms that setup of the new default E-RAB on the Uu interface is completed. The MME 150 then initiates completion of setup of the default E-RAB on the S1-U interface by sending a Modify Bearer Request 432 to the SGW 120. By sending a Modify Bearer Response to 433 to the MME 150, the SGW 120 confirms that setup of the new default E-RAB is also completed on the S1-U interface.

As can be seen, in the processes of FIG. 4 it is efficiently avoided that a context which is no longer valid is maintained. Accordingly, resources can be used in an efficient manner and inconsistent behavior avoided.

Figure 5:
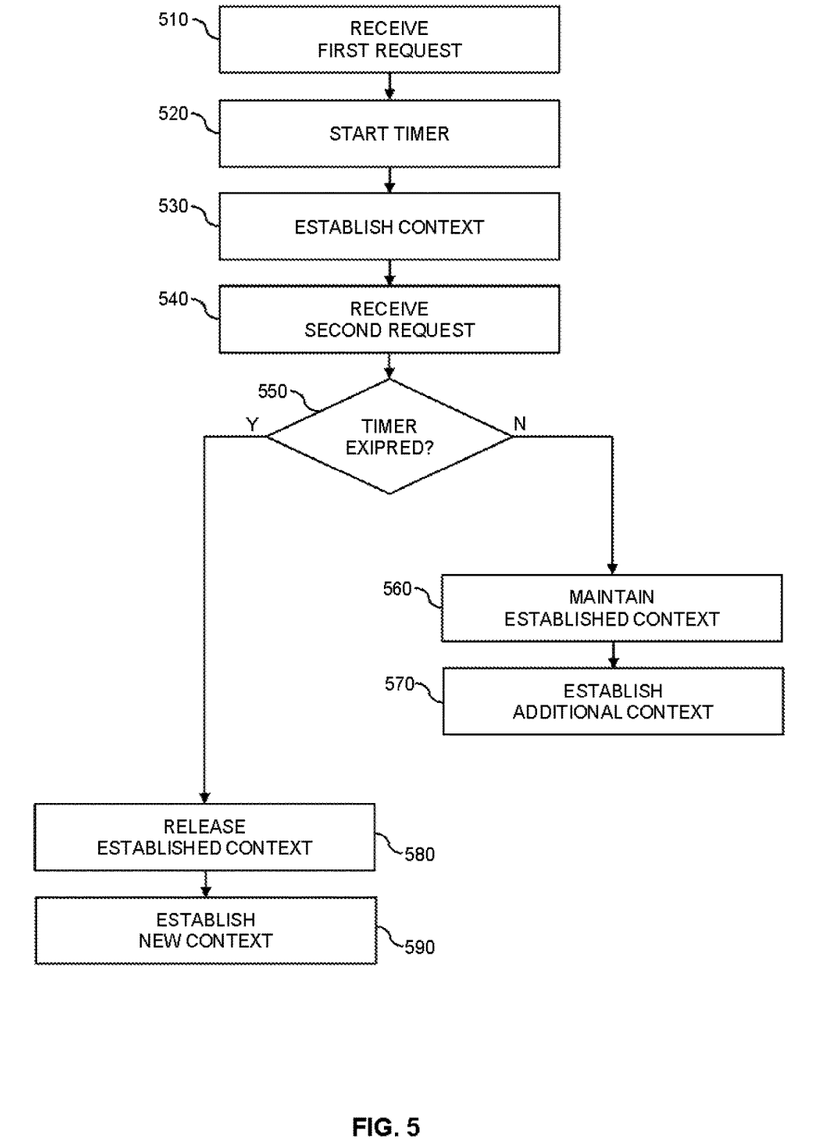
FIG. 5 shows a flowchart for schematically illustrating a method according to an embodiment of the invention.

FIG. 5 shows a flowchart for illustrating a method of controlling establishment of a connection between a communication device and a wireless communication network. The communication device may for example correspond to a UE, such as the above-mentioned UE 10. The wireless communication network may for example be based on the LTE radio access technology and use an architecture as illustrated in FIG. 1. However, it is noted that other types of wireless communication network could be utilized as well, e.g., a wireless communication network based on a 5G technology. The method of FIG. 5 may be utilized for implementing the illustrated concepts in a node of the wireless communication network. If a processor-based implementation of the node is used, the steps of the method may be performed and/or controlled by one or more processors of a device implementing the node. Such device may also include a memory storing program code for implementing the below described functionalities or steps of the method.

At step 510, the node receives a first request for establishment of a connection between the communication device and the wireless communication network. Examples of such first request are the above-mentioned service requests conveyed by the Initial UE Message 204, 304, or 404. The first request may indicate a first cause for establishment of the connection.

At step 520, upon receiving the first request, the node starts a timer. An example of such timer is the above-mentioned timer "tServiceReq".

At step 530, in response to the first request, the node establishes a context for the connection between the communication device and the wireless communication network. Here, establishing of the context may involve initiating setup of a default bearer between the communication device and the wireless communication network, such as the above-mentioned default E-RAB.

At step 540, the node receives a second request for establishment of a connection between the communication device and the wireless communication network. Examples of such second request are the above-mentioned service requests conveyed by the Initial UE Message 219, 319, 419. The second request may indicates a second cause for establishment of the connection. The second cause for establishment of the connection may be different from the first cause for establishment of the connection, as indicated by the first request.

Depending on a state of the timer when receiving the second request, the node selects between: A) establishing an additional context for the connection between the communication device and the wireless communication network while maintaining the established context, and B) releasing the established context and establishing a new context for the connection between the communication device and the wireless communication network.

The above selection may involve checking the state of the timer as illustrated at step 550. At step 550, the node may check whether timer has expired when receiving the second request. If the timer has not expired when receiving the second request, the node may proceed with steps 560 and 570, as illustrated by branch "N". If the timer has expired when receiving the second request, the node may proceed with steps 580 and 590, as illustrated by branch "Y".

At step 560, the node maintains the established context, and at step 570 the node establishes the additional context for the connection between the communication device and the wireless communication network, in accordance with the above-mentioned option A). Accordingly, in response to receiving the second request before expiry of the timer, the node may establish the additional context while maintaining the established context. Here, establishing of the additional context may involve initiating setup of an additional bearer between the communication device and the wireless communication network. For example, the node may request setup of the additional bearer at an access node serving the communication device, such as explained in connection with the above-mentioned E-RAB Setup Requests 223 and 323. Establishing of the additional context may also involve requesting creation of a new session at a gateway serving the communication device. For example, the node may request establishment of a management session for an additional bearer, such as explained in connection with the above-mentioned Create Session Request 221.

In response to receiving the second request before expiry of the timer, the node may also reset the timer. In this way, the timer may also be used for efficiently handling further requests, issued subsequently to the second request, in a similar manner as the second request.

Examples of processes in which the node receives the second request before expiry of the timer and establishes an additional context while maintaining the established context are explained in connection with FIGS. 2 and 3.

At step 580 the node releases the established context, and at step 590 the node establishes a new context for the connection between the communication device and the wireless communication network. In accordance with the above-mentioned option B). Accordingly, in response to receiving the second request after expiry of the timer, the node may release the established context and establish the new context. In response to receiving the second request after expiry of the timer, the node may also restart the timer.

It is noted that the method of FIG. 5 may for example also be implemented in a system which includes the node of the wireless communication network, the communication device, and optionally also further elements. For example, such system could include the above-mentioned MME 150 and the above-mentioned UE 10, and optionally also the eNB 110 and/or the SGW 120.

Figure 6:
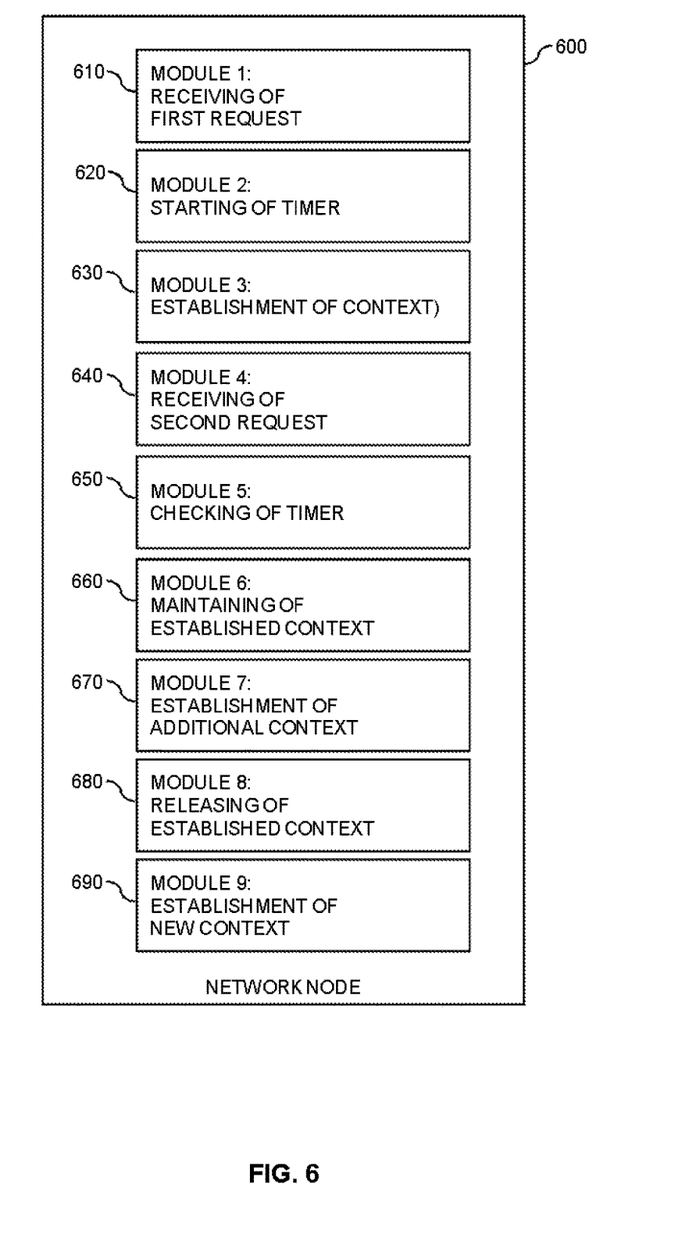
FIG. 6 shows a block diagram for illustrating functionalities of a network node according to an embodiment of the invention.

FIG. 6 shows a block diagram for illustrating functionalities of a network node 600 which operates according to the method of FIG. 5. As illustrated, the network node 600 may be provided with a module 610 configured to receive a first request for establishment of a connection between a communication device and the wireless communication network, such as explained in connection with step 510. Further, the network node 600 may be provided with a module 620 configured to start a timer upon receiving the first request, such as explained in connection with step 520. Further, the network node 600 may be provided with a module 630 configured to establish a context for the connection between the communication device and the wireless communication network, such as explained in connection with step 530. Further, the network node 600 may be provided with one or more modules configured to select depending on a state of the timer when receiving the second request between: A) establishing an additional context for the connection between the communication device and the wireless communication network while maintaining the established context, and B) releasing the established context and establishing a new context for the connection between the communication device and the wireless communication network. As illustrated, these one or more modules may include a module 650 configured to check the timer, such as explained in connection with step 550. Further, these one or more modules may include a module 660 configured to maintain the established context, such as explained in connection with step 560. Further, these one or more modules may include a module 670 configured to establish the additional context, such as explained in connection with step 570. Further, these one or more modules may include a module 680 configured to release the established context, such as explained in connection with step 580. Further, these one or more modules may include a module 690 configured to establish the new context, such as explained in connection with step 590.

It is noted that the network node 600 may include further modules for implementing other functionalities, such as known functionalities of an MME or similar node. Further, it is noted that the modules of the network node 600 do not necessarily represent a hardware structure of the network node 600, but may also correspond to functional elements, e.g., implemented by hardware, software, or a combination thereof.

Figure 7:
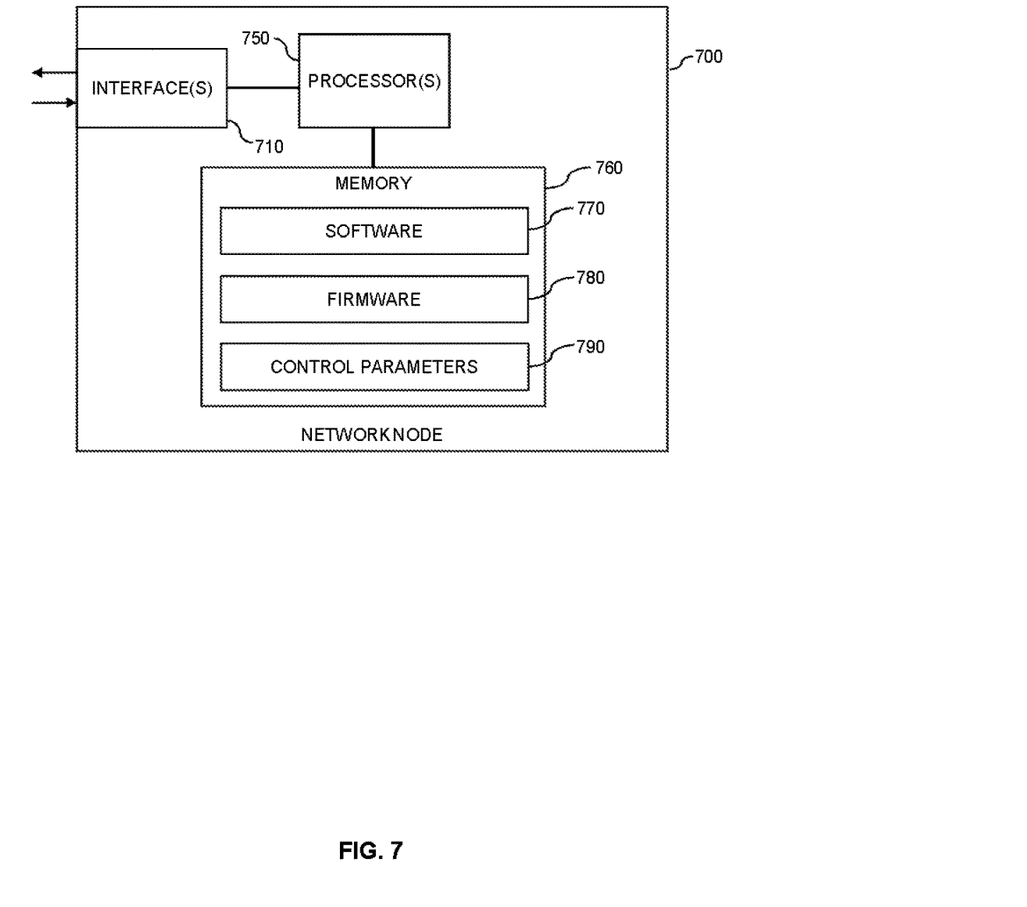
FIG. 7 schematically illustrates structures of a network node according to an embodiment of the invention.

FIG. 7 illustrates a processor-based implementation of network node 700 which may be used for implementing control of connection establishment in accordance with the above described concepts. For example, the structures as illustrated in FIG. 7 may be used for implementing the concepts in the above-mentioned MME 150 or in a similar node, such as an AMF of a 5G technology.

As illustrated, the network node 700 may include one or more interface 710. The interface(s) 710 may correspond to the above-mentioned S1-MME interface and S11 interface or to one or more corresponding interfaces of an AMF of a 5G technology.

Further, the network node 700 may include one or more processors 750 coupled to the interface(s) 710 and a memory 760 coupled to the processor(s) 750. By way of example, the interface(s) 710, the processor(s) 750, and the memory 760 could be coupled by one or more internal bus systems of the network node 700. The memory 760 may include a Read-Only-Memory (ROM), e.g., a flash ROM, a Random Access Memory (RAM), e.g., a Dynamic RAM (DRAM) or Static RAM (SRAM), a mass storage, e.g., a hard disk or solid state disk, or the like. As illustrated, the memory 760 may include software 770, firmware 780, and/or control parameters 790. The memory 760 may include suitably configured program code to be executed by the processor(s) 750 so as to implement the above-described functionalities of a network node, such as explained in connection with FIG. 5.

It is to be understood that the structures as illustrated in FIG. 7 are merely schematic and that the network node 700 may actually include further components which, for the sake of clarity, have not been illustrated, e.g., further interfaces or processors. Also, it is to be understood that the memory 760 may include further program code for implementing known functionalities of an MME or similar node. According to some embodiments, also a computer program may be provided for implementing functionalities of the apparatus 700, e.g., in the form of a physical medium storing the program code and/or other data to be stored in the memory 760 or by making the program code available for download or by streaming.

As can be seen, the concepts as described above may be used for implementing efficient establishment of a connection between a communication device and a wireless communication network. In particular, situations can be efficiently handled in which the communication device issues multiple requests for establishment of a connection within a short time span, due to multiple different services substantially simultaneously requiring transmission of data between the communication device and the wireless communication network. In such situations, it can be avoided that an earlier issued request and related data transport is adversely affected by a later request. Accordingly, user experience and efficiency of the wireless communication network can be improved. This is in particular beneficial in the case of a service involving real-time transport of data, such as a voice call or multimedia call. In this case, the concepts allow for avoiding that a service request relating to a service involving real-time transport of data is adversely affected by a subsequent service request for some other service. In this way, for example a delay of call establishment or a call drops can be avoided.

It is to be understood that the examples and embodiments as explained above are merely illustrative and susceptible to various modifications. For example, the illustrated concepts may be applied in connection with various kinds of wireless communication technologies, without limitation to the LTE technology or a 5G technology. Here, it is noted that when using another wireless communication technology, the above-mentioned designations of nodes, interfaces, and/or messages may deviate from the above-mentioned examples. Moreover, it is to be understood that the above concepts may be implemented by using correspondingly designed software to be executed by one or more processors of an existing device, or by using dedicated device hardware. Further, it should be noted that the illustrated nodes or apparatuses may each be implemented as a single device or as a system of multiple interacting devices.

The invention claimed is:

1. A method of controlling radio connectivity in a wireless communication network, implemented by a node of the wireless communication network, the method comprising:
   receiving a first request for establishment of a connection between a communication device and the wireless communication network;
   upon receiving the first request, starting a timer and establishing a context for the connection between the communication device and the wireless communication network;
   receiving a second request for establishment of a connection between the communication device and the wireless communication network; and
   depending on a state of the timer when receiving the second request, selecting between:
      establishing an additional context for the connection between the communication device and the wireless communication network while maintaining the established context, and
      releasing the established context and establishing a new context for the connection between the communication device and the wireless communication network.

2. The method of claim 1, further comprising: in response to receiving the second request before expiry of the timer, establishing the additional context while maintaining the established context.

3. The method of claim 2, further comprising resetting the timer in response to receiving the second request before expiry of the timer.

4. The method of claim 1, further comprising: in response to receiving the second request after expiry of the timer, releasing the established context and establishing the new context.

5. The method of claim 4, further comprising restarting the timer in response to receiving the second request after expiry of the timer.

6. The method of claim 1, wherein the establishing of the additional context comprises initiating setup of an additional bearer between the communication device and the wireless communication network.

7. The method of claim 6, further comprising requesting setup of the additional bearer at an access node serving the communication device.

8. The method of claim 1, wherein the establishing of the additional context comprises requesting creation of a new session at a gateway serving the communication device.

9. The method of claim 1, wherein the first request indicates a first cause for setting up the connection and the second request indicates a second cause for setting up the connection.

10. The method of claim 9, wherein the second cause is different from the first cause.

11. The method of claim 1, wherein the node comprises a Mobility Management Entity of the LTE technology.

12. A node for a wireless communication network, the node comprising:
   at least one processor and a memory containing instructions executable by the at least one processor, whereby the node is operative to:
      receive a first request for establishment of a connection between a communication device and the wireless communication network;
      upon receiving the first request, start a timer and establish a context for the connection between the communication device and the wireless communication network;
      receive a second request for establishment of a connection between the communication device and the wireless communication network; and
      depending on a state of the timer when receiving the second request, select between:
         establishing an additional context for the connection between the communication device and the wireless communication network while maintaining the established context; and
         releasing the established context and establishing a new context for the connection between the communication device and the wireless communication network.

13. The node of claim 12, the memory containing instructions executable by the at least one processor, whereby the node is further operative to, in response to receiving the second request before expiry of the timer, establish the additional context while maintaining the established context.

14. The node of claim 13, the memory containing instructions executable by the at least one processor, whereby the node is further operative to reset the timer in response to receiving the second request before expiry of the timer.

15. The node of claim 12, the memory containing instructions executable by the at least one processor, whereby the node is further operative to, in response to receiving the second request after expiry of the timer, release the established context and establish the new context.

16. The node of claim 15, the memory containing instructions executable by the at least one processor, whereby the node is further operative to restart the timer in response to receiving the second request after expiry of the timer.

17. The node of claim 12, wherein the establishing of the additional context comprises initiating setup of an additional bearer between the communication device and the wireless communication network.

18. The node of claim 17, the memory containing instructions executable by the at least one processor, whereby the node is further operative to request setup of the additional bearer at an access node serving the communication device.

19. The node of claim 12, wherein the establishing of the additional context comprises requesting creation of a new session at a gateway serving the communication device.

20. The node of claim 12, wherein the first request indicates a first cause for setting up the connection and the second request indicates a second cause for setting up the connection.

21. The node of claim 20, wherein the second cause is different from the first cause.

22. The node of claim 12, wherein the node comprises a Mobility Management Entity of the LTE technology.

23. A system, comprising:
   a communication device configured to initiate a first request for establishment of a connection between the communication device and the wireless communication network and a second request for establishment of a connection between the communication device and the wireless communication network; and
   a node of the wireless communication network, the node being configured to:
   receive the first request;
   upon receiving the first request, start a timer and establish a context for the connection between the communication device and the wireless communication network;
   receive a second request for establishment of a connection between a communication device and the wireless communication network; and
   depending on a state of the timer when receiving the second request, select between:
      establishing an additional context for the connection between the communication device and the wireless communication network while maintaining the established context; and
      releasing the established context and establishing a new context for the connection between the communication device and the wireless communication network.

24. A non-transitory computer readable medium comprising program code executable by at least one processor of a node of a wireless communication network, whereby execution of the program code causes the node to:
   receive a first request for establishment of a connection between a communication device and the wireless communication network;
   upon receiving the first request, start a timer and establish a context for the connection between the communication device and the wireless communication network;
   receive a second request for establishment of a connection between a communication device and the wireless communication network; and
   depending on a state of the timer when receiving the second request, select between:
      establishing an additional context for the connection between the communication device and the wireless communication network while maintaining the established context, and
      releasing the established context and establishing a new context for the connection between the communication device and the wireless communication network.

* * * * *